Oct. 16, 1945.   A. PROCTER   2,387,181
PISTON CONSTRUCTION, PACKING
Original Filed Jan. 24, 1942
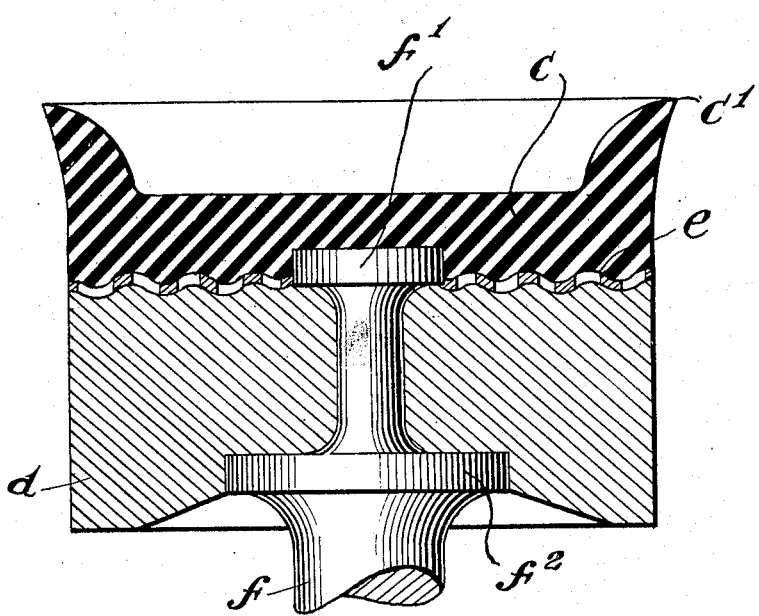
Inventor
ANTHONY PROCTER
BY Francis E. Boyce
ATTORNEY Patented Oct. 16, 1945

2,387,181

UNITED STATES PATENT OFFICE 2,387,181

PISTON CONSTRUCTION, PACKING

Anthony Procter, Newcastle-upon-Tyne 1, England

Original application January 24, 1942, Serial No. 428,140. Divided and this application December 10, 1942, Serial No. 468,489. In Great Britain February 14, 1941

4 Claims. (Cl. 309—4)

This invention relates to packing devices for plungers and pistons, and its object is to provide devices of this kind with a firm base portion, this application being a division of my copending application Serial No. 428,140.

These packing devices for plungers and pistons, may be U, cup or hat washers.

More particularly the object of the present invention is to provide a U, hat or cup sealing washer composed of a resilient synthetic or natural rubber (jointly hereinafter referred to as "rubber") flanged sealing portion bonded to a synthetic resin base portion.

By synthetic resin is meant a synthetic resinous material which on heating to a certain temperature fuses or softens, and sets, or on cooling sets, into a hard and rigid body. Suitable materials of this kind which fuse and set irreversibly whilst still hot are for example phenol-formaldehyde and urea-formaldehyde synthetic resins. These resins are usually introduced into a mould in the form of a more or less granular powder or as tablets of compressed powder.

For the above purpose, according to the invention, a U, hat or cup sealing washer, is composed of a resilient rubber sealing flanged portion and a synthetic resin base portion moulded by heat and set in interlocking contact with the rubber sealing flanged portion.

The synthetic resin may be bonded to the rubber solely by fusion or softening and setting of the former merely in contact with the latter. However, to ensure a reliable bond between the two materials, an intertying fabric, composed for instance of a woven fabric, wire gauze or paper, or perforated sheet metal, may be embedded in the rubber and extend into and become embedded in the fused or softened synthetic resin, or may be merely located at the junction between them. The junction may have a mechanically interlocked structure.

The bonding of the rubber portion of a rubber flanged sealing washer to the synthetic resin base portion can be effected by enclosing the rubber portion of the sealing washer in a mould having a cavity of the profile of the complete washer and thereafter moulding the synthetic res'n base portion in interlocking contact with the rubber portion, from synthetic resin moulding powder introduced into and filling the remainder of the cavity.

The mould may be first used to mould and vulcanise the rubber portion of the sealing washer, whilst the portion of the cavity wherein the synthetic resin base portion is subsequently moulded is occupied by an annular metal piece or pieces constituting a dummy of the profile of the base portion. On completion of the moulding and vulcanising of the rubber portion, the metal dummy is removed from the mould leaving a cavity into which the synthetic resin moulding powder is introduced and in which it is fused.

It may be convenient to press and shape the rubber portion first without however vulcanising or completely vulcanising it, and to mould and set the synthetic resin simultaneously with the vulcanisation or completion of the vulcanisation of the rubber portion. The rubber in such case being practically in its finished shape, it is easy to control the exact position of the junction between the synthetic resin and the rubber. The shaping of the rubber portion may be effected in a die other than the mould in which the simultaneous curing of the rubber and synthetic resin is subsequently effected.

The bonding of the rubber portion to the synthetic resin portion can be promoted by beads or recesses, for instance of dovetail section, being moulded on or in the respective neck portion of the former which becomes enclosed and compressed or occupied, by synthetic resin on the latter fusing or softening and setting.

A piston embodying a representative example of a cup sealing washer in accordance with the invention is illustrated in axial section on the accompanying drawing.

A cup washer is shown in the drawing consisting of a rubber portion $c$ having a substantially axially directed peripheral flange $c^1$. A synthetic resin base $d$, constituting a piston, has been cast in contact with the rubber portion $c$ through the perforations of an interposed wavy sheet $e$ of perforated metal having an affinity for rubber, such as brass. In addition to the direct bond of the synthetic resin through the perforations, there is an indirect bond due to the chemical bonding of the rubber to the metal and the interlocking of the synthetic resin with the metal through and behind the perforations thereof. The sheet $e$ could, alternatively, be a sheet of stout rubber-affinitive metal gauze. The synthetic resin piston $d$ has also been cast around and in interlocked engagement with the end of a metal piston rod $f$, between collars $f^1$, $f^2$ on the rod. The collar $f^1$ at the extremity is embedded in the rubber $c$.

In all cases at least part of the synthetic resin can be introduced into the mould in the form of fabric or paper impregnated with synthetic resin as an alternative to synthetic resin powder, which need then be used only at the situation where a somewhat complicated interlock is effected.

This is a division of application Serial Number 428,140 filed January 24, 1942.

I claim:

1. A piston comprising, a flexible rubber sealing flanged portion, a rigid base portion composed of moulded synthetic resin, and interposed between said rubber portion and said synthetic resin portion a sheet of material affinitive and chemically bonded to said rubber and presenting interstices penetrated by said synthetic resin.

2. A piston comprising, a flexible rubber sealing flanged portion, a rigid base portion of moulded synthetic resin, and interposed between said rubber portion and said synthetic resin portion a perforated metal sheet affinitive and chemically bonded to said rubber with said synthetic resin penetrating the perforations thereof.

3. A piston comprising, a flexible rubber sealing flanged portion, a rigid base portion composed of moulded synthetic resin, and interposed between said rubber portion and said synthetic resin portion a wavy sheet of material affinitive and chemically bonded to said rubber and presenting interstices penetrated by said synthetic resin.

4. A piston comprising, a flexible rubber sealing flanged portion, a rigid base portion of moulded synthetic resin, and interposed between said rubber portion and said synthetic resin portion a wavy perforated metal sheet affinitive and chemically bonded to said rubber with said synthetic resin penetrating the perforations thereof.

ANTHONY PROCTER.